(12) United States Patent
Keller et al.

(10) Patent No.: US 11,598,431 B2
(45) Date of Patent: Mar. 7, 2023

(54) MULTIPLE CHANNEL SELECTOR VALVE

(71) Applicant: IDEX Health & Science, LLC, Rohnert Park, CA (US)

(72) Inventors: Michael Keller, Napa, CA (US); Audrey Schrock, Mt. Juliet, TN (US); Mark Tschann, Santa Rosa, CA (US); Ashna Sandhu, San Francisco, CA (US)

(73) Assignee: IDEX Health & Science, LLC, Rohnert Park, CA (US)

( * ) Notice: Subject to any disclaimer, the term of this patent is extended or adjusted under 35 U.S.C. 154(b) by 127 days.

(21) Appl. No.: 17/290,645

(22) PCT Filed: Nov. 1, 2019

(86) PCT No.: PCT/US2019/059394
§ 371 (c)(1),
(2) Date: Apr. 30, 2021

(87) PCT Pub. No.: WO2020/092902
PCT Pub. Date: May 7, 2020

(65) Prior Publication Data
US 2021/0388909 A1  Dec. 16, 2021

Related U.S. Application Data

(60) Provisional application No. 62/754,221, filed on Nov. 1, 2018.

(51) Int. Cl.
*F16K 11/074* (2006.01)
*G01N 30/20* (2006.01)
*G01N 30/46* (2006.01)

(52) U.S. Cl.
CPC ........ *F16K 11/0743* (2013.01); *G01N 30/20* (2013.01); *G01N 30/468* (2013.01); *G01N 2030/201* (2013.01); *G01N 2030/202* (2013.01)

(58) Field of Classification Search
CPC .................. F16K 11/0743; G01N 2030/202
See application file for complete search history.

(56) References Cited

U.S. PATENT DOCUMENTS

| | | | |
|---|---|---|---|
| 1,121,140 A | * | 12/1914 | Schoonmaker ..... F16K 11/0743 137/625.21 |
| 4,665,947 A | * | 5/1987 | Ito ....................... F16K 11/0743 137/625.2 |

(Continued)

FOREIGN PATENT DOCUMENTS

| | | |
|---|---|---|
| JP | 2012159460 | 8/2012 |
| JP | 2016173249 | 9/2016 |
| WO | 2018107022 | 6/2018 |

OTHER PUBLICATIONS

Examination Report dated Mar. 22, 2022 by the Japanese Patent Office in Japanese patent application No. 2021-523350.

(Continued)

*Primary Examiner* — Robert K Arundale
(74) *Attorney, Agent, or Firm* — Haugen Law Firm PLLP

(57) ABSTRACT

A multiple channel selector valve includes a stator and a rotor that is rotatable with respect to the stator. The rotor face includes first and second fluid flow paths for transferring fluids to selected sets of passages in the stator. The fluid flow paths in the rotor face are specifically configured to accommodate high fluid flow rate regimes while reducing flow restriction.

16 Claims, 19 Drawing Sheets

(56) References Cited

U.S. PATENT DOCUMENTS

| | | | |
|---|---|---|---|
| 6,012,488 | A | 1/2000 | Nichols |
| 8,322,374 | B2 | 12/2012 | Tomita |
| 9,032,819 | B2 | 5/2015 | Nichols et al. |
| 9,739,383 | B2 | 8/2017 | Nichols et al. |
| 2006/0042686 | A1 | 3/2006 | Gamache et al. |
| 2013/0000390 | A1 | 1/2013 | Mseda et al. |
| 2015/0090345 | A1 | 4/2015 | Olovsson |
| 2016/0033049 | A1 | 2/2016 | Nichols et al. |
| 2016/0305916 | A1 | 10/2016 | Olovsson |
| 2016/0313289 | A1 | 10/2016 | Olovsson et al. |
| 2020/0326316 | A1* | 10/2020 | Simard-Lecours ......................... F16K 31/1221 |

OTHER PUBLICATIONS

International Search Report and Written Opinion dated Jan. 21, 2020 in International Patent Application No. PCT/US2019/59394.

\* cited by examiner

MULTIPLE CHANNEL SELECTOR VALVE

FIELD OF THE INVENTION

The present invention relates to fluid valves generally, and more particularly to multiple-channel valves used in fluidics and analyses, including liquid chromatography.

BACKGROUND OF THE INVENTION

Selector valves have been widely implemented for various fluidics applications to selectively direct fluid among a plurality of flow paths. An example application is in multiple column liquid chromatography, wherein the fluid flow may be selectively directed to and among a plurality of separation columns to effect the desired overall chromatographic separation.

An example selector valve that may be used in chromatographic applications is described in U.S. Pat. No. 9,739,383, which is assigned to the present assignee, and is herein incorporated by reference in its entirety. While the valve described in U.S. Pat. No. 9,739,383 has proven to be effective, certain high flow rate applications (e.g. 200 ml/min) utilizing the valve generates a backpressure that can cause issues with instruments and fittings elsewhere in the system.

It is therefore an object of the present invention to provide a multiple-channel selector valve that can accommodate high fluid flow rate regimes, such as in preparative scale liquid chromatography, while maintaining backpressure values below target thresholds. In some embodiments, the target backpressure threshold is 5 bar (72.5 psi) at the fluid flow rate of 200 ml/min.

SUMMARY OF THE INVENTION

By means of the present invention, fluid flow back pressure values may be managed even in relatively high fluid flow rate regimes through multiple channel shear valves. Accommodation is made for unique flow pathways through the multiple channel selector valve that reduce flow restriction.

In an embodiment, a multiple channel selector valve includes a stator with a front face, a dynamic face, and a plurality of passages extending through the stator to fluidically connect the front face and the dynamic face. The plurality of passages include first passages extending between respective openings in the dynamic face and first ports in the front face, second passages extending between respective second openings in the dynamic face and second ports in the front face, an intake passage extending between an intake opening in the dynamic face and an intake port in the front face, and an outlet passage extending between an outlet opening in the dynamic face and an outlet port in the front face. The selector valve further includes a rotor that is rotatable with respect to the stator about a rotational axis and having a rotor face that is configured to sealingly engage with the dynamic face of the stator. The rotor face includes a first fluid flow path for fluidically coupling the intake opening to selected ones of the first openings and a second fluid flow path for fluidically coupling the outlet opening to selected ones of the second openings. The second fluid flow path includes a transfer portion and a relief portion, with the transfer portion having a proximal end that transitions to the relief portion and a distal end. The transfer portion is flared from the distal end to the proximal end by between about 10-75°. The relief portion is annularly arranged about the rotational axis by at least 30°.

In another embodiment, the multiple channel selector valve of the present invention includes a stator having a front face, a central axis, and a generally opposed dynamic face including a plurality of first openings arranged in a first circumaxial pattern about the central axis, and a plurality of second openings arranged in a second circumaxial pattern about the central axis. The selector valve further includes a rotor that is rotatable with respect to the stator about a rotational axis coincident with the central axis and having a rotor face configured to sealingly engage with the dynamic face of the stator. The rotor face includes a first fluid flow path and a second fluid flow path. The first fluid flow path extends from a rotational center of the rotor face to a first end to selectively fluidically connect to any one of the first openings. The second fluid flow path includes a transfer portion and a relief portion with the transfer portion being flared from a distal end in fluid communication with any one of the second openings to a proximal end by between about 10-75°. The relief portion of the second fluid flow path is annularly arranged about the rotational axis by at least 30°.

A further embodiment of a multiple channel selector valve of the present invention includes a stator having a front face, a dynamic face, and a plurality of passages extending through the stator to fluidically connect the front face and the dynamic face. The plurality of passages include first passages extending between respective first openings in the dynamic face and first ports in the front face, second passages extending between respective second openings in the dynamic face and second ports in the front face, an intake passage extending between an intake opening in the dynamic face and an intake port in the front face, and an outlet passage extending between an outlet opening in the dynamic face and an outlet port in the front face. At least some of the passages include a first portion having a first axis and a first diameter and a second portion having a second axis angled with respect to the first axis and a second diameter that is different than the first diameter. The selector valve further includes a rotor that is rotatable with respect to the stator about a rotational axis and having a rotor face configured to sealingly engage with the dynamic face of the stator. The rotor face includes a first fluid flow path for fluidically coupling the intake opening to selected ones of the first openings, and a second fluid flow path for fluidically coupling the outlet opening to selected ones of the second openings.

A BRIEF DESCRIPTION OF THE DRAWINGS

DETAILED DESCRIPTION OF THE PREFERRED EMBODIMENTS

Figure 1:
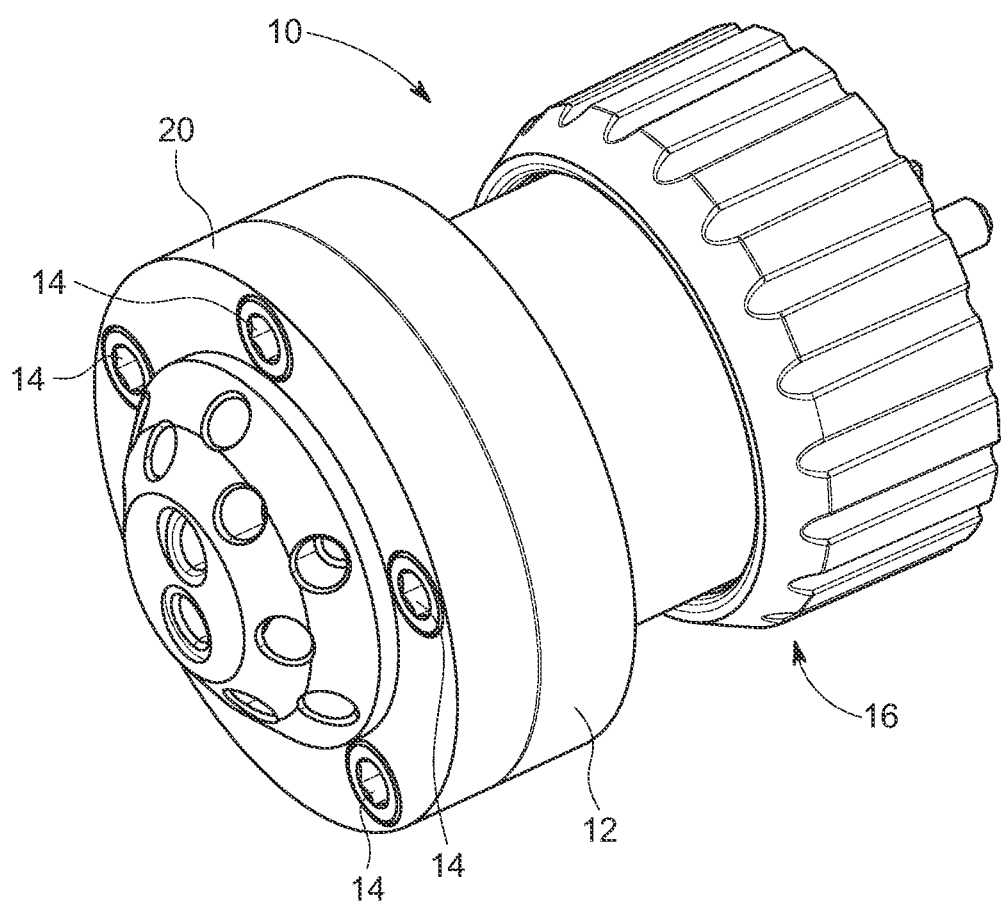
FIG. 1 is a perspective view of a multiple channel selector valve of the present invention.

An embodiment of a multiple-channel selector valve 10 of the present invention is illustrated in FIG. 1. In an example application, a fluid stream may be directed through valve 10 to one or more selected output channels, such as to one or more chromatographic columns, and then returned to valve 10 for routing to downstream analysis by, for example, a detector.

Figure 2A:
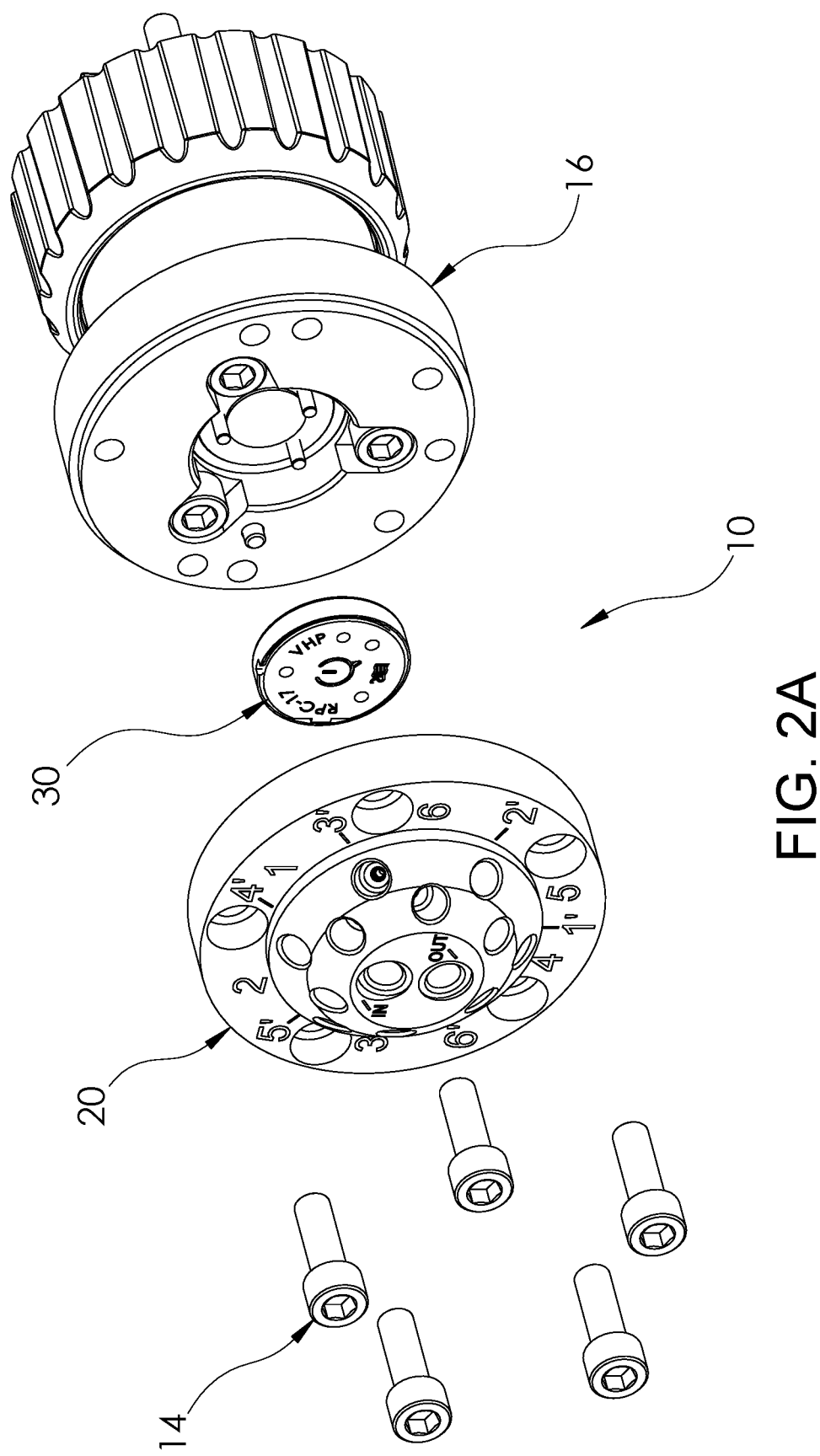
FIG. 2A is an exploded front perspective view of a multiple channel selector valve of the present invention.
Figure 2B:
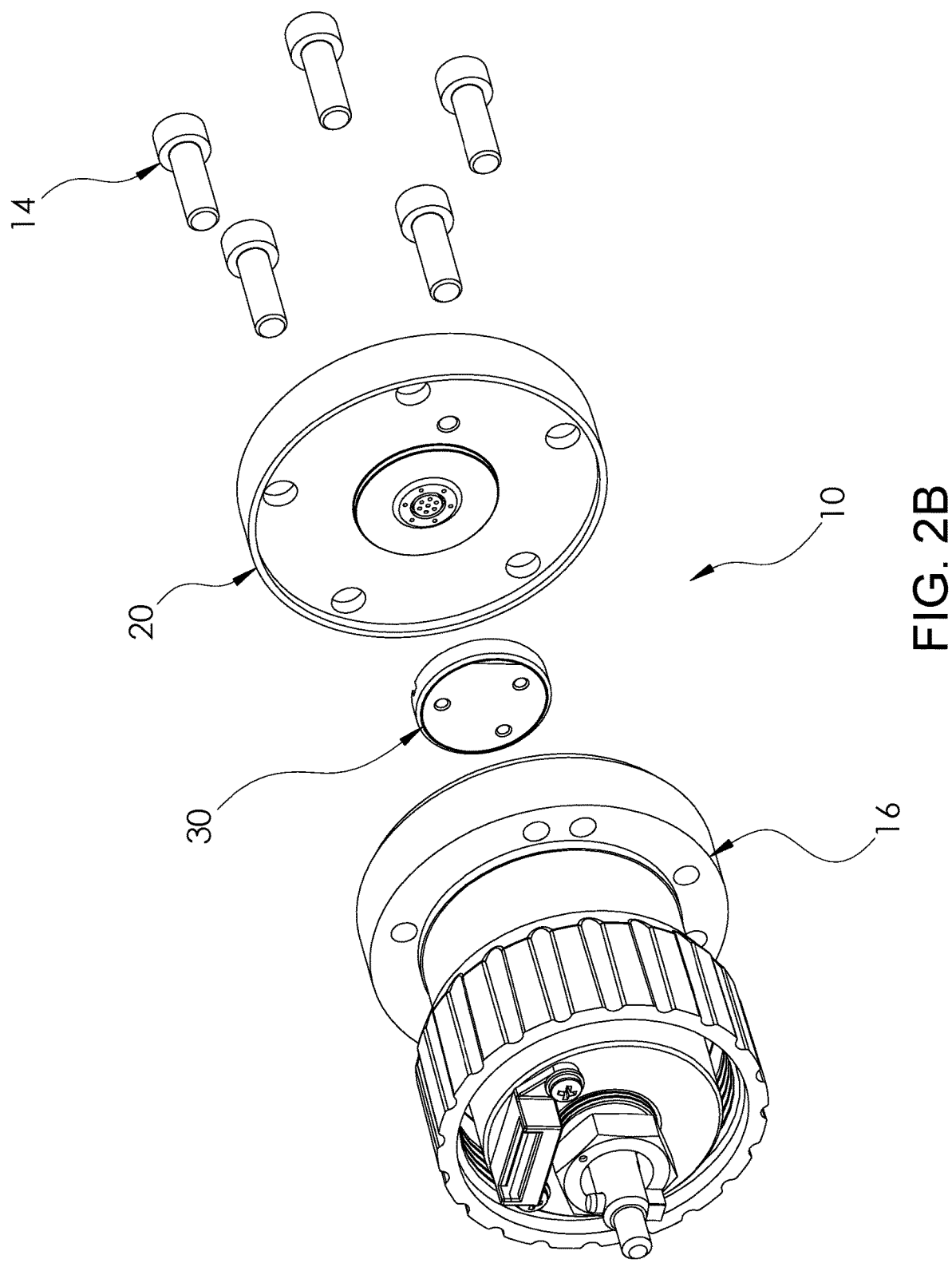
FIG. 2B is an exploded rear perspective view of a multiple channel selector valve of the present invention.

Selector valve 10 includes a stator 20 fixedly secured to the valve body 16 by fasteners 14. In the exploded perspective view of FIG. 2, it is seen that rotor 30 is arranged in valve 10 for rotation by the valve shaft passing through the valve body 16 in connection to a motor assembly with respect to stator 20. The relationships and general functionalities of the component parts of selector valve 10 are as those described in U.S. Pat. No. 9,739,383. A key difference in selector valve 10 of the present invention from the valve described in U.S. Pat. No. 9,739,383 is the structure of dynamic face 32 of rotor 30, and its relationship with stator dynamic face 22.

Figure 3:
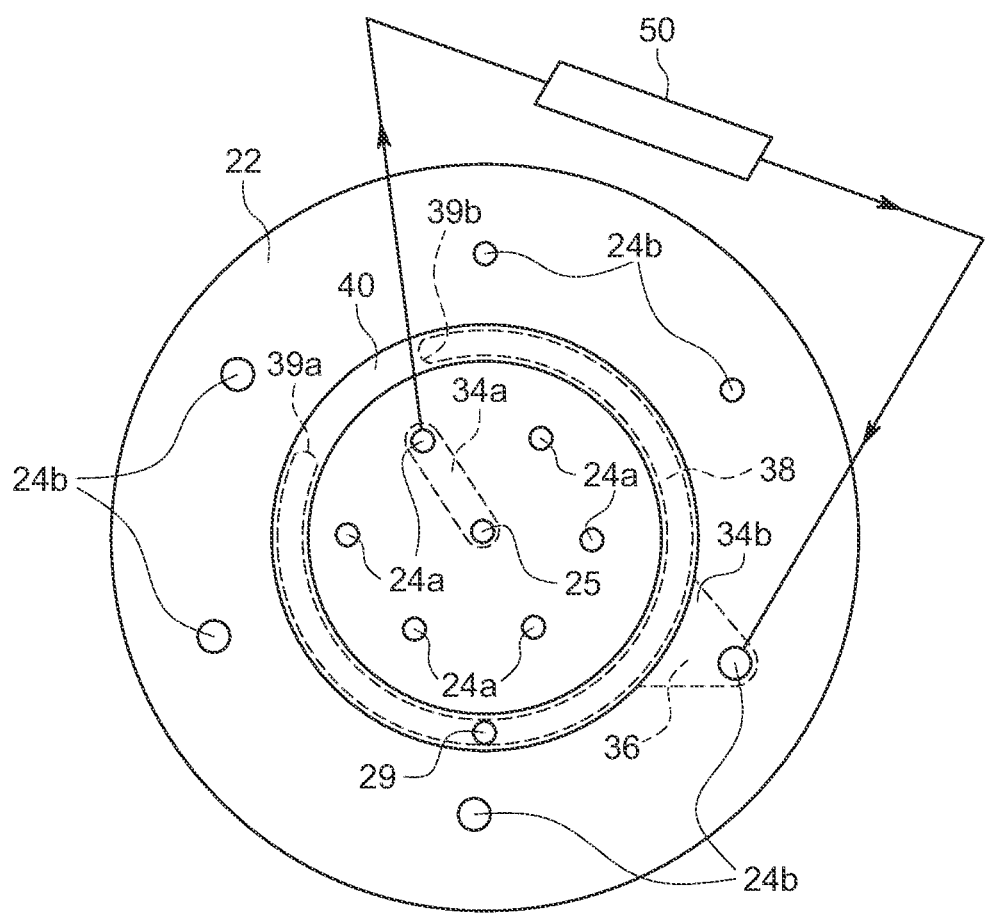
FIG. 3 is an illustration of a stator portion with a rotor portion transparently superimposed thereover.

FIG. 3 is an illustration of stator dynamic face 22 with rotor 30 transparently superimposed thereover. The broken lines illustrate features of rotor 30 that are not otherwise illustrated in FIG. 3. Stator dynamic face 22 includes first openings 24a to first passages 26a (illustrated in FIG. 4) and second openings 24b to second passages 26b (illustrated in FIG. 4). First openings 24a may be fluidically connected to a central opening 25 by a first groove 34a in rotor dynamic face 32 when rotor 30 is engaged with stator 20 in valve 10. In this embodiment, rotor 30 is arranged to rotate about a longitudinal axis to provide a selection of a flow path from among six pathways through corresponding ports. The stator dynamic face 22 and the rotor dynamic face 32 are the respective surfaces of stator 20 and rotor 30 at the stator-rotor interface.

First openings 24a and second openings 24b at stator dynamic face 22 may, such as in the illustrated embodiment, be arranged in concentric rings. It is contemplated, however, that other arrangements for first and second openings 24a, 24b may be incorporated into selector valve 10 of the present invention.

The illustrated embodiment depicts six each of first and second openings 24a, 24b, which could therefore service up to six distinct chromatographic columns or other treatment apparatus.

Figure 4:
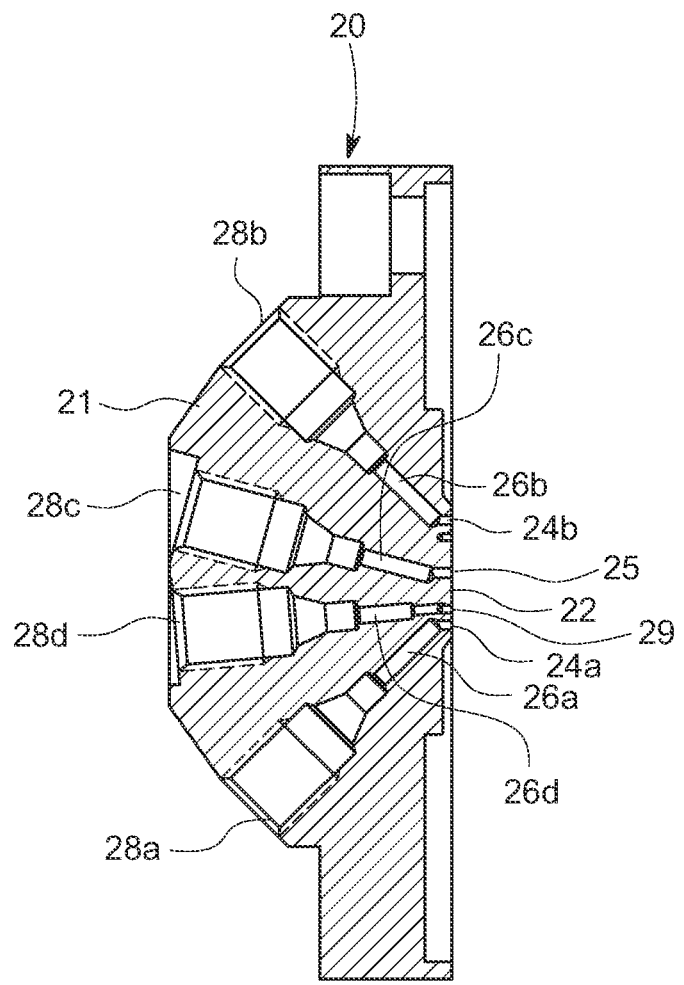
FIG. 4 is a cross-sectional view of a stator portion of a multiple channel selector valve of the present invention.
Figure 5:
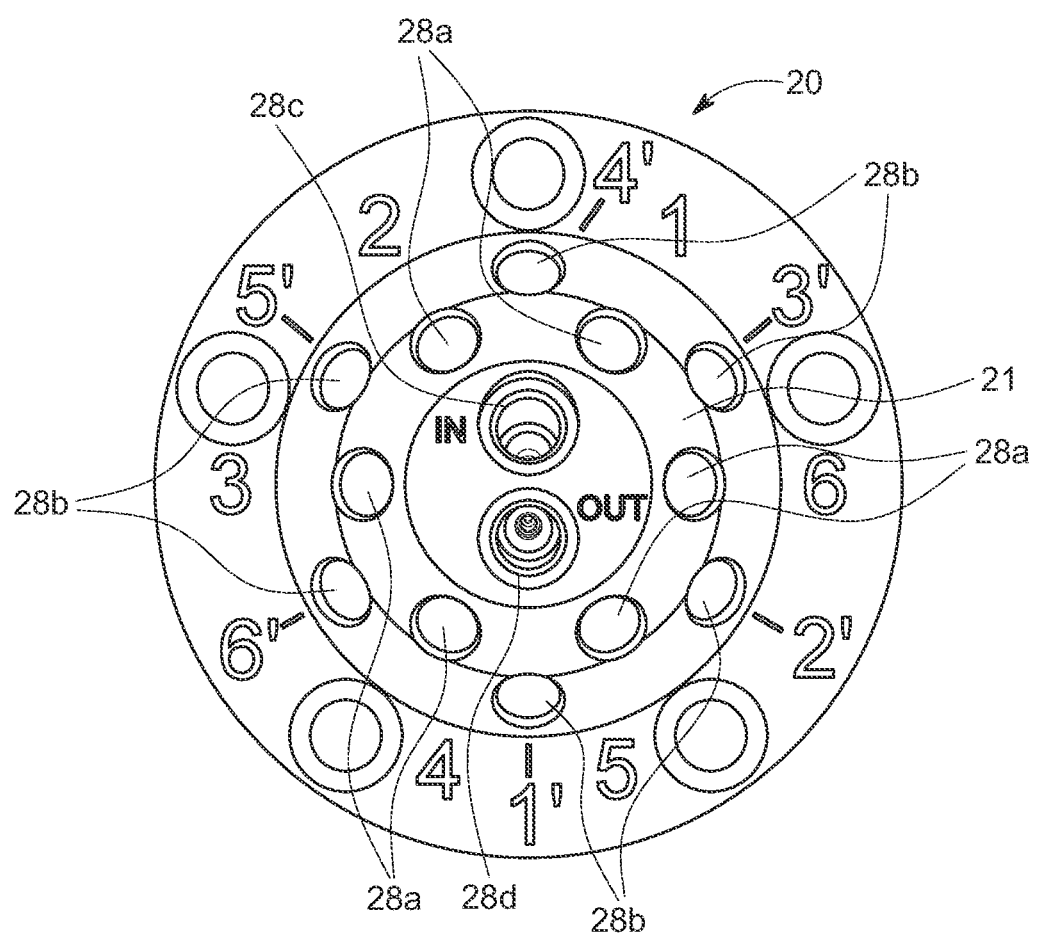
FIG. 5 is a front elevational view of a stator portion of a multiple channel selector valve of the present invention.

As illustrated in FIGS. 4 and 5, stator 20 includes first and second ports 28a, 28b at stator front face 21. First ports 28a open to respective first passages 26a so that first ports 28a are fluidically connected with respective first openings 24a through respective first passages 26a. Likewise, second openings 28b at front face 21 open to second passages 26b so that second ports 28b and respective openings 24b are fluidically connected by respective second passages 26b. In the illustrated embodiment, an intake port 28c opens to an intake passageway 26c to fluidically connect intake port 28c to central opening 25. An outlet port 28d opens to an outlet passageway 26d to fluidically connect outlet port 28d to an outlet opening 29 at stator dynamic face 22. In preferred embodiments, outlet opening 29 may be at least partially contained in a collection groove 40 in stator dynamic face 22.

When the operable rotation of rotor 30 positions first groove 34a to be superimposed over both central opening 25 and a respective one of first openings 24a at stator dynamic face 22, fluid flow is permitted, via first groove 34a in rotor dynamic face 32, between central opening 25 and such respective first opening 24a of stator 20. When rotor 30 is rotated to a position at which first groove 34a is not superimposed over any of first openings 24a, central opening 25 is fluidically decoupled from any of first openings 24a so that fluid flow is ceased.

Similarly, second groove 34b of rotor 30 may be used to fluidically couple collection groove 40 and second openings 24b of stator 20. In some embodiments, collection groove 40 may be an annular groove that is formed into stator dynamic face 22 circumaxially between first openings 24a and second openings 24b. When rotor 30 is operably rotated such that second groove 34b is superimposed over at least one of second openings 24b, a fluidic connection is established among such second opening 24b, collection groove 40, and outlet opening 29 in collection groove 40. Rotation of rotor 30 relative to stator 20 so that second groove 34b is not superimposed over any of second openings 24b fluidically decouples collection groove 40 from second openings 24b, and fluid flow is ceased.

An example fluid flow path through selector valve 10 includes fluid from a sample injector through intake port 28c in stator front face 21. The fluid then flows through intake passage 26c in stator 20 to central opening 25 and into first groove 34a of rotor 30. When rotor 30 is rotated to be superimposed over a first opening 24a, such as that illustrated in FIG. 3, the fluid then flows through first groove 34a and into such fluidically coupled first opening 24a in stator 20. From such first opening 24a, the fluid flows through the respective first passage 26a and first port 28a into the selected treatment apparatus 50, such as a chromatographic column. The fluid flow direction is indicated by arrows in FIG. 3, although it is contemplated that the fluid flow direction may be reversed from that described herein. In the illustrated case, the fluid then flows from the treatment apparatus 50 into a second port 28b at stator front face 21, and into a respective second passage 26b. Fluid flow continues through a respective second opening 24b of such second passage 26b and into second groove 34b of rotor 30. The fluid flow passes through at least a portion of second groove 34b and, in some embodiments, in collection groove 40. The fluid flow is expelled from the stator/rotor interface in the example fluid flow direction through outlet opening 29, outlet passage 26d, and outlet port 28d of stator 20.

Figure 6:
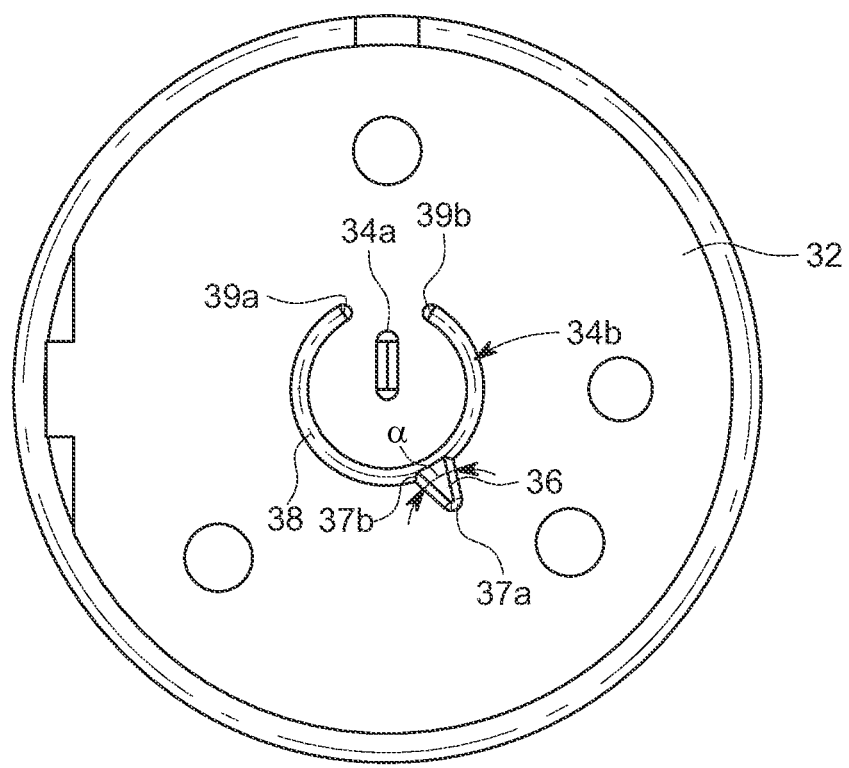
FIG. 6 is an elevational view of a rotor portion of a multiple channel selector valve of the present invention.
Figure 7A:
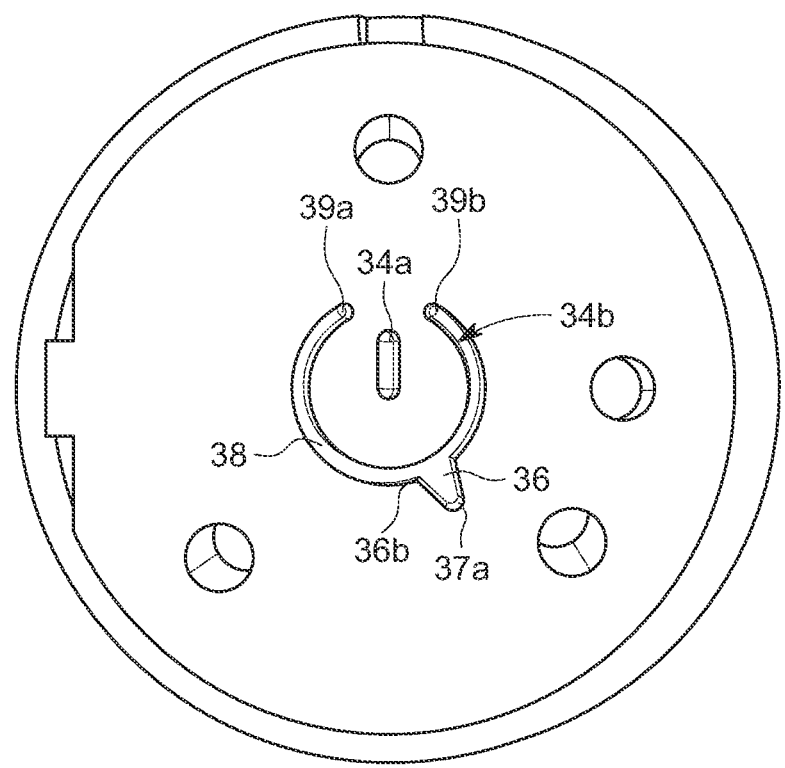
FIG. 7A is an illustration of a rotor portion of a multiple channel selector valve of the present invention.
Figure 7B:
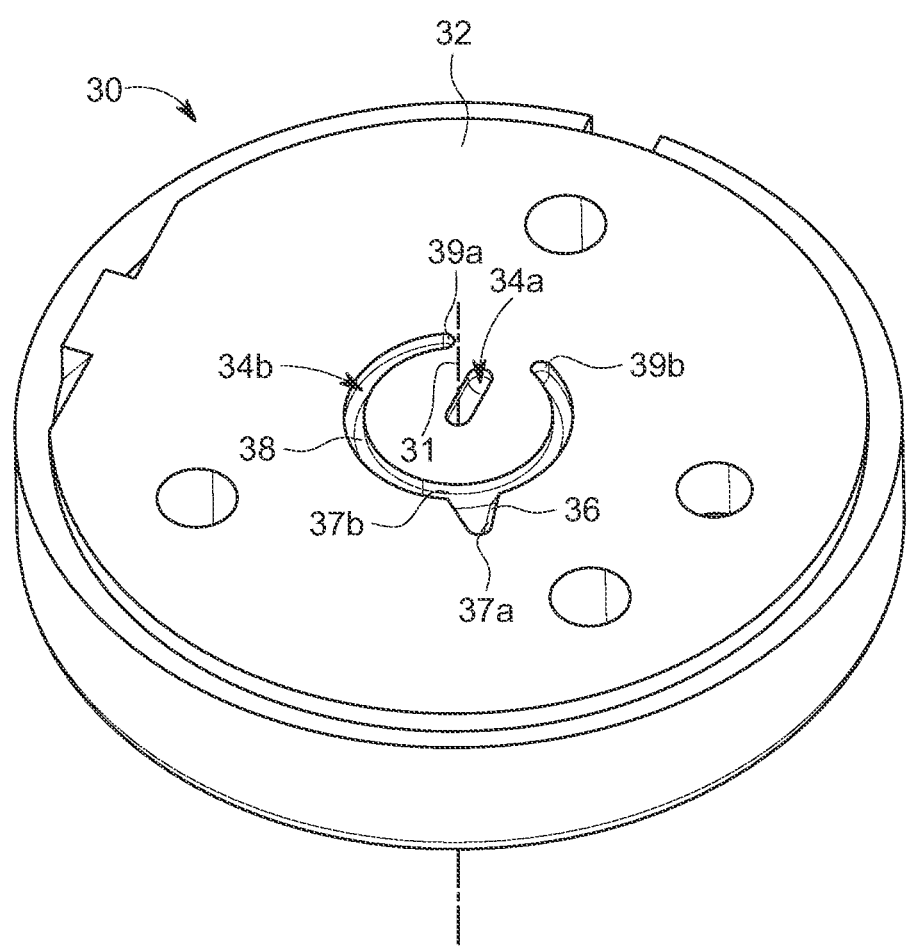
FIG. 7B is a perspective view of a rotor portion of a multiple channel selector valve of the present invention.

To accommodate relatively high flow regimes, such as 200 ml/min or more without inducing a backpressure exceeding a threshold value, such as 5 bar (72.5 psi), Applicant has discovered an arrangement for second groove 34b. As illustrated in FIGS. 6-7B, second groove 34b may include a transfer portion 36 and a relief portion 38 formed in rotor dynamic face 32. In some embodiments, transfer portion 36 and relief portion 38 form a continuous groove/depression in rotor dynamic face 32, so that transfer portion 36 and relief portion 38 are at all times fluidically connected. In other embodiments, transfer portion 36 may be fluidically disconnected from relief portion 38 in rotor dynamic face 32, such that fluidic connection between transfer portion 36 and relief portion 38 is accomplished only through the cooperation of a channel, groove, or other formation in stator dynamic face 22. An example such formation may be collection groove 40.

In the illustrated embodiment, transfer portion 36 of second groove 34b extends from a narrowed distal end 37a to a broadened proximal end 37b. In some embodiments, proximal end 37b is the point at which transfer portion 36 merges with relief portion 38 to form a continuous second groove 34b. Transfer portion 36 may, in some embodiments, have a flare angle α from narrowed portion 37a to broadened portion 37b of between about 10-75°, and more preferably between about 15-50°, and still more preferably between about 20-40°. Transfer portion 36 may, in some embodiments, have a depth into rotor dynamic face 32 of between about 0.005-0.05 in (0.13-1.3 mm) and more preferably between about 0.01-0.03 in (0.25-0.75 mm). As illustrated in FIG. 3, transfer portion 36 of second groove 34b may be arranged at rotor dynamic face 32 to be selectively superimposable over at least one of second openings 24b in stator dynamic face 22. Transfer portion 36 of second groove 34b is preferably configured to convey fluid flow between selected ones of second openings 24b and collection groove 40 in stator dynamic face 22. In embodiments of selector valve 10 without a collection groove 40, however, transfer portion 36 may be configured to fluidically communicate only with relief portion 38 to permit fluid flow between outlet opening 29 and one or more selected ones of second openings 24b in stator dynamic face 22. The illustrated arrangement of transfer portion 36, with a broadened proximal end 37b permits smooth fluid transfer between transfer portion 36 and one or more of relief portion 38 and collection groove 40, and also reduces frictional resistance to fluid flow between the selected opening 24b and one or more of relief portion 38 and collection groove 40.

Figure 8A:
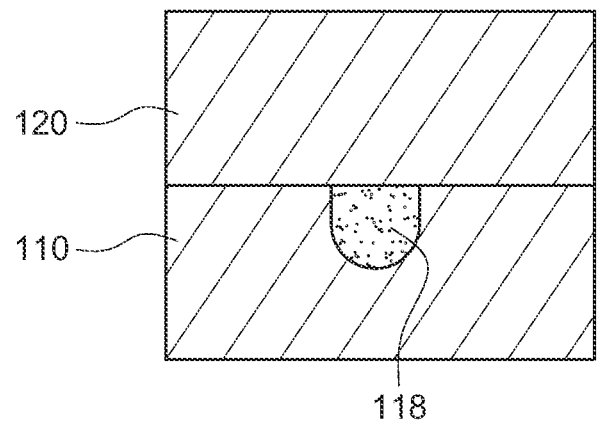
FIG. 8A is a cross-sectional view of a rotor-stator interface of a prior art multiple channel selector valve.
Figure 8B:
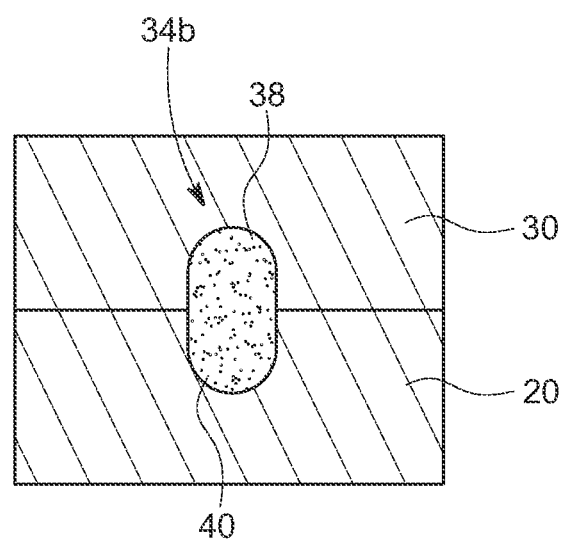
FIG. 8B is a cross-sectional view of a rotor-stator interface of a multiple channel selector valve of the present invention.

Relief portion 38 of second groove 34b may, in some embodiments, be configured and arranged to be operably superimposed over at least a portion of collection groove 40. Such superimposition increases the effective volume of the fluid passageway between outlet opening 29 and the selected one or more of second openings 24b. The increased fluid passageway volume correspondingly decreases fluid backpressure, which is particularly noticeable in relatively high fluid flow rate regimes. A comparison schematic illustrating the fluid flow path modification embodied in the present invention is set forth in FIGS. 8A and 8B. The design of U.S. Pat. No. 9,739,383 illustrated in FIG. 8A includes a collection ring 118 in stator 110 in facing relationship with rotor 120. By contrast, some embodiments of selector valve 10 of the present invention include a relief portion 38 of second groove 34b in rotor 30 that is operably superimposed over collection groove 40 in stator 20. The total volume available for fluid flow in a channel defined by the combination of collection groove 40 and relief portion 38 is substantially greater than that provided in the prior art design. Such substantially increased volume contributes to a reduction in fluid flow backpressure through selector valve 10.

In the illustrated embodiment, relief portion 38 of second groove 34b forms an annular path at least partially about a rotational axis 31 of rotor 30 in rotor face 32. Relief portion 38 may include closed ends 39a, 39b to annularly extend at least 30° about rotational axis 31, preferably at least 60° about rotational axis 31 and more preferably at least 180° or 270° about rotational axis 31. However, it is contemplated that relief portion 38 of second groove 34b may form an endless path that may be operably superimposable over at least a portion of collection groove 40. It is also contemplated that second groove 34b, including the described transfer portion 36 and relief portion 38 may be employed in a selector valve 10 wherein stator dynamic face 22 does not include a collection groove 40. In such an embodiment, a fluidic connection between outlet opening 29 and a selected one or more of second passages 26b may be established through second groove 34b alone.

Figure 9:
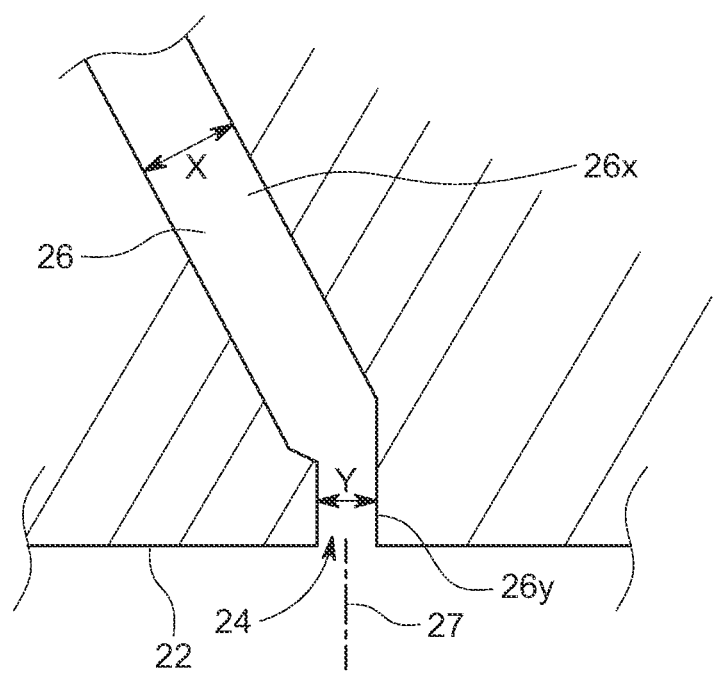
FIG. 9 is an enlarged cross-sectional view of a stator portion of a multiple channel selector valve of the present invention.
Figure 10A:
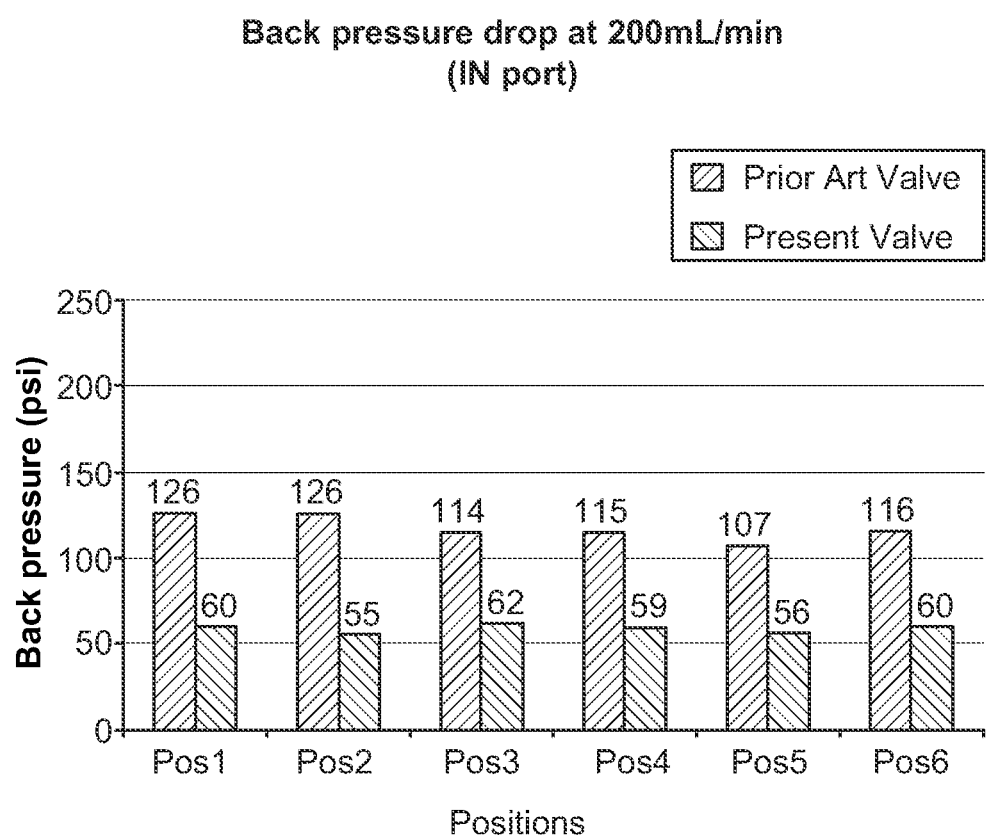
FIG. 10A is a chart plotting back pressure drop at 200 ml/min at the inlet port.
Figure 10B:
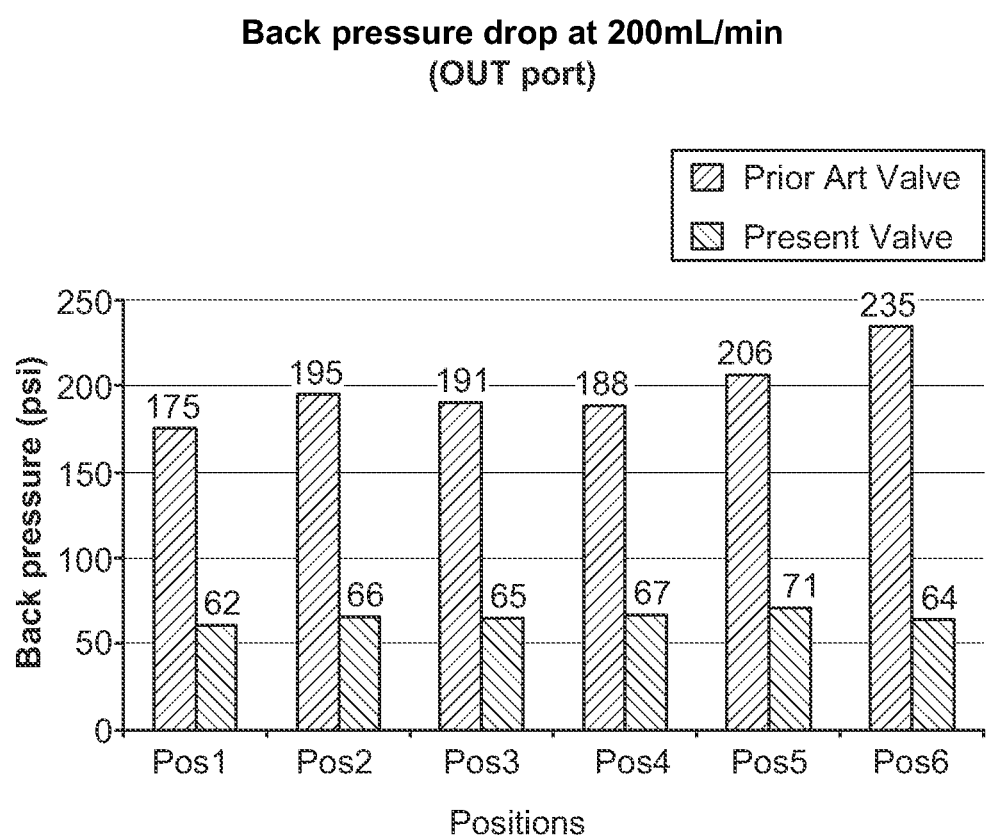
FIG. 10B is a chart plotting back pressure drop at 200 ml/min at the outlet port.
Figure 10C:
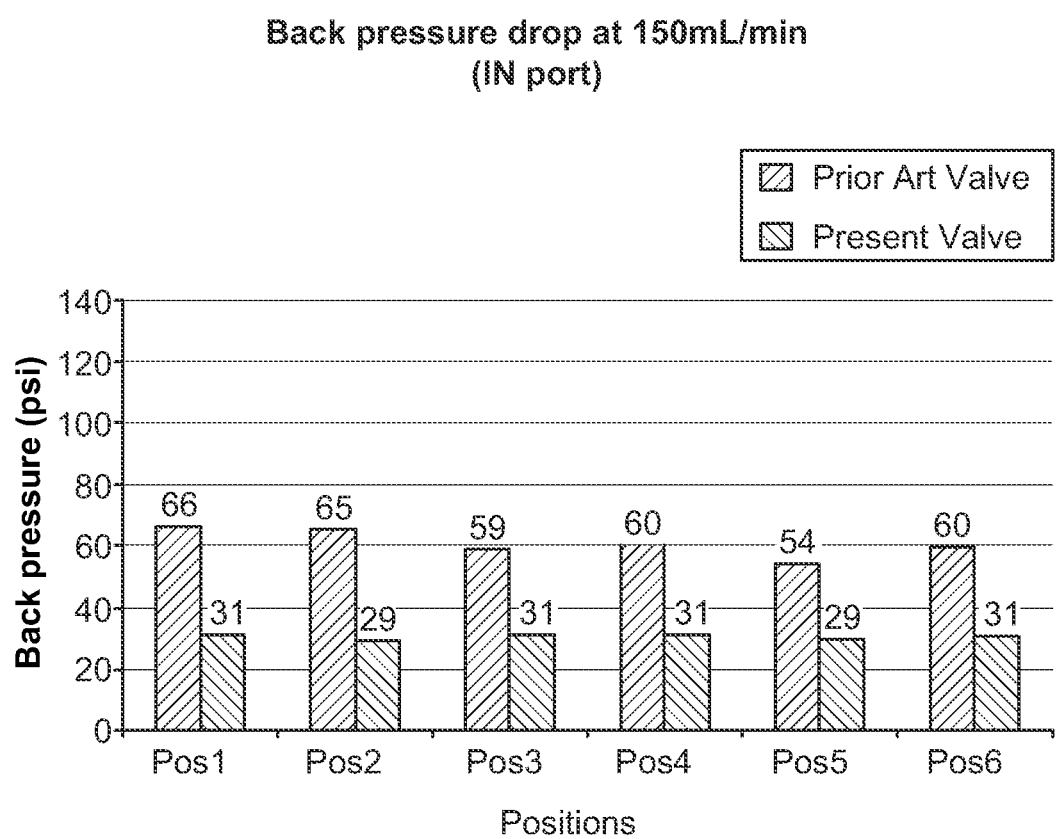
FIG. 10C is a chart plotting back pressure drop at 150 ml/min at the inlet port.
Figure 10D:
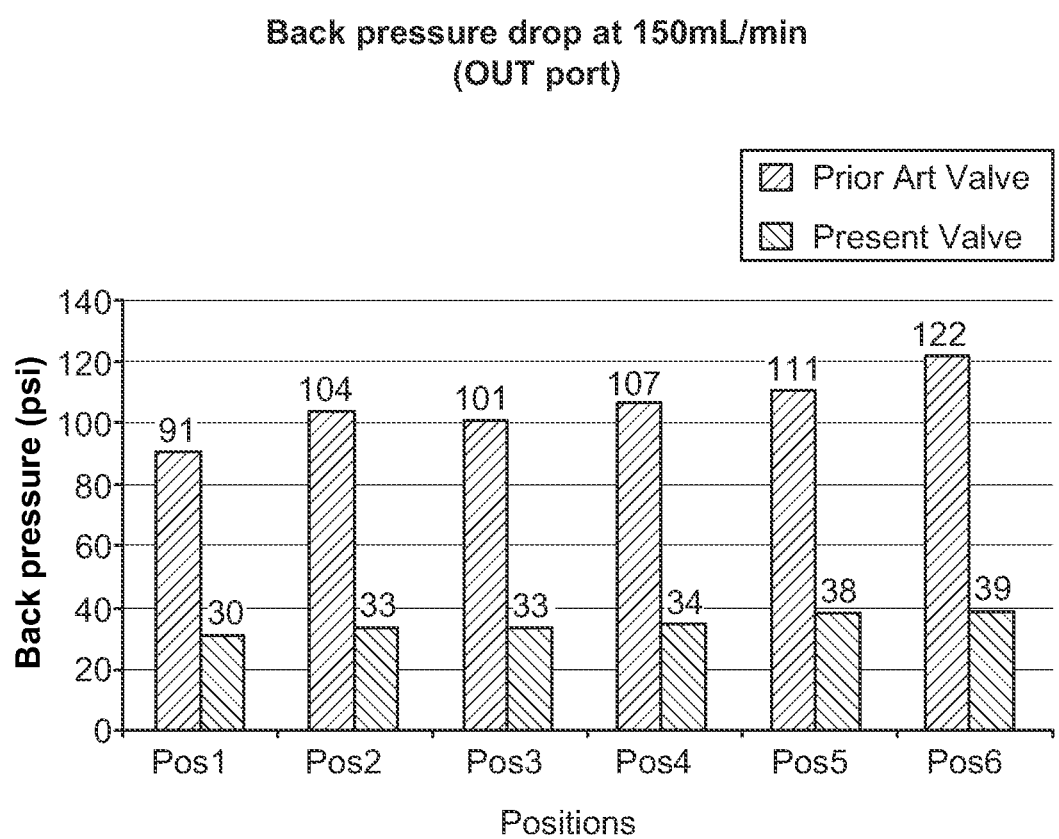
FIG. 10D is a chart plotting back pressure drop at 150 ml/min at the outlet port.
Figure 10E:
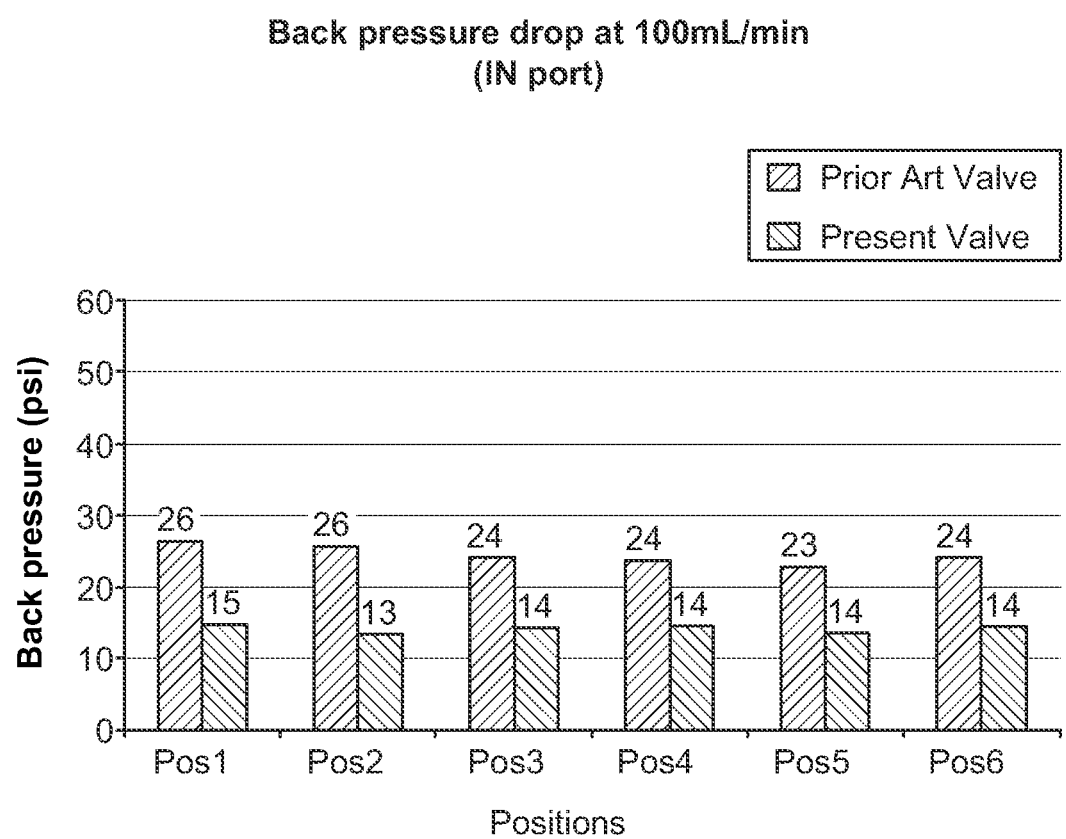
FIG. 10E is a chart plotting back pressure drop at 100 ml/min at the inlet port.
Figure 10F:
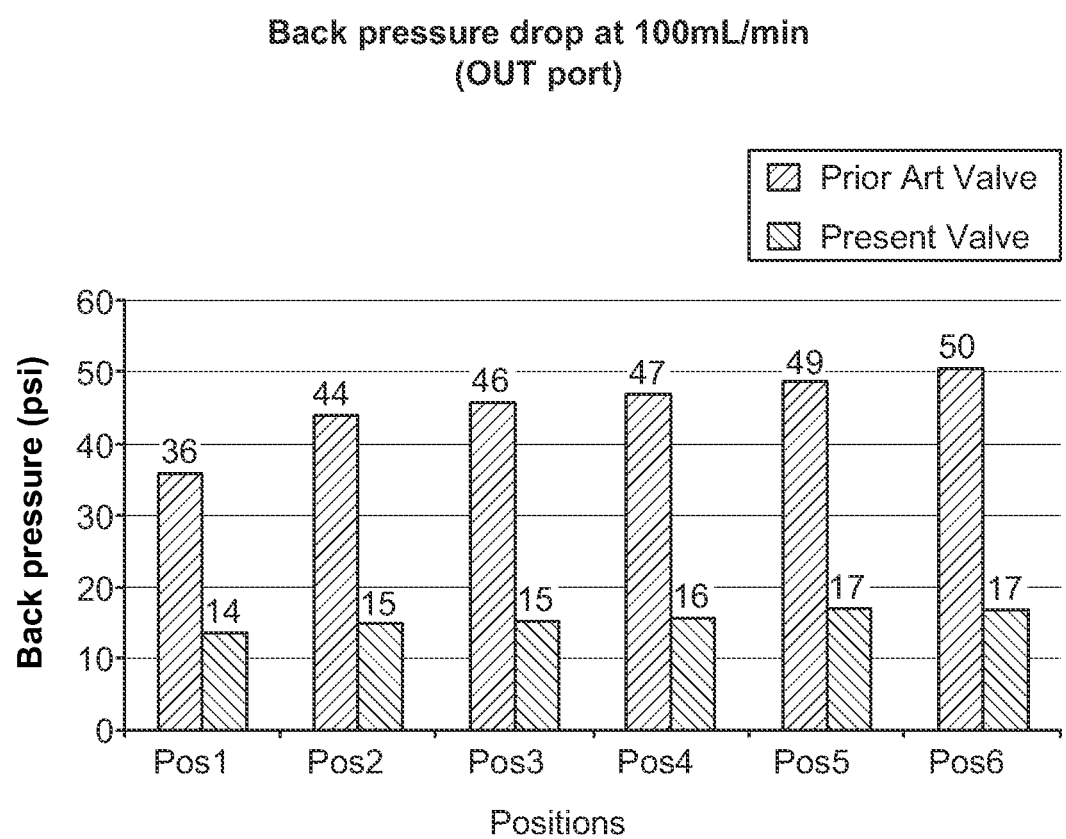
FIG. 10F is a chart plotting back pressure drop at 100 ml/min at the outlet port.
Figure 10G:
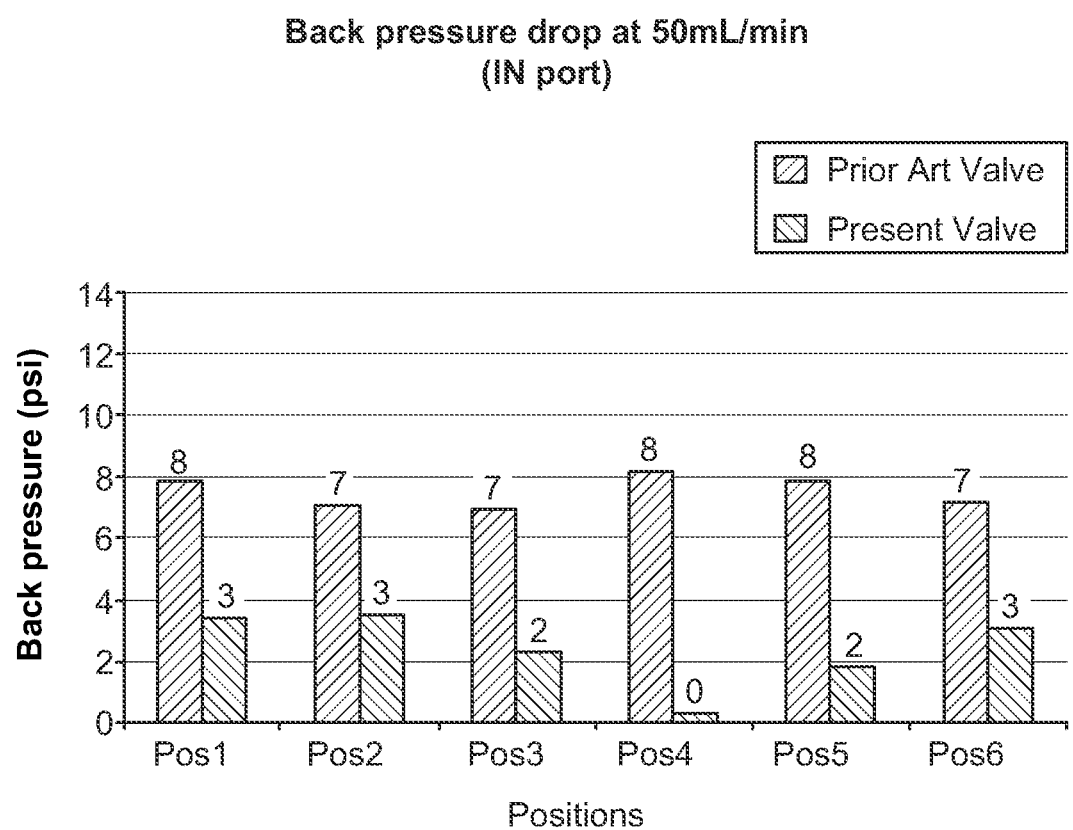
FIG. 10G is a chart plotting back pressure drop at 50 ml/min at the inlet port.
Figure 10H:
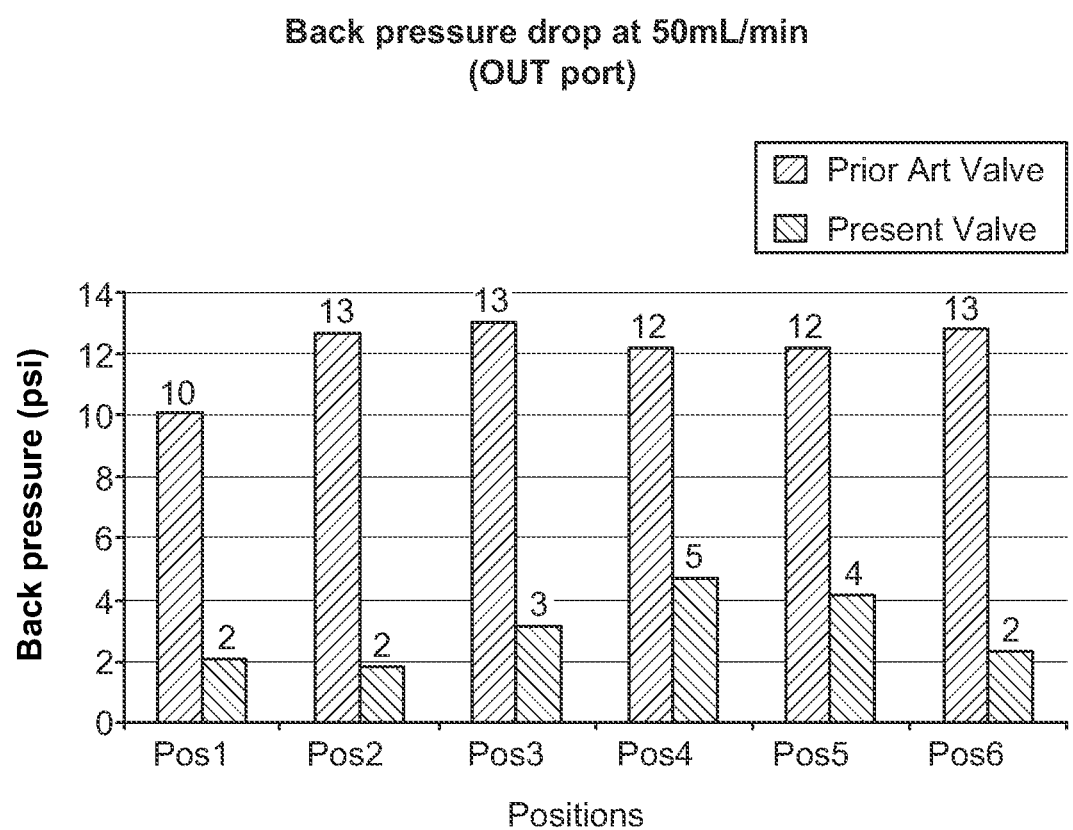
FIG. 10H is a chart plotting back pressure drop at 50 ml/min at the outlet port.

Another aspect of the present invention is the provision of compound passages 26a-26d, as illustrated in FIG. 4, and schematically represented in FIG. 9. Schematic passage 26 includes a first portion 26x having a first diameter "x" that is greater than a second diameter "y" of second portion 26y of passage 26. Moreover, second portion 26y of passage 26 may preferably be oriented with a central axis 27 that is substantially perpendicular to stator dynamic face 22. Applicant has determined that such an orientation, at least for second portion 26y of passage 26 with respect to stator dynamic face 22 reduces fluid flow resistance and improves overall fluid flow dynamics at a respective opening 24 of stator 20. In some embodiments, second diameter "y" may be between about 20%-90% of first diameter "x", and more preferably between about 30%-70% of first diameter "x". In a particular example embodiment, first diameter "x" is about 0.037 in (0.94 mm) and second diameter "y" is about 0.020 in (0.51 mm).

EXPERIMENTAL

A comparison study was performed for fluid flow backpressure comparing an embodiment of the valve described in U.S. Pat. No. 9,739,383 to a multiple channel selector valve of the present invention. The following table sets forth the fluid channel dimensions of each valve tested in the study:

|  | Prior Art Valve | Present Valve |
| --- | --- | --- |
| Stator Passages (in.) | 0.020 (uniform, linear) | 0.037-0.020 (compound) |
| Collection Groove Maximum Depth (in.) | 0.014 | 0.016 |
| Superimposed circumferential second groove (in.) | none | 0.014 |

The valves were tested for backpressure at different flow rates (50 ml/min, 100 ml/min, 150 ml/min, 200 ml/min). Charts illustrated in FIGS. 10A-10H show a substantial reduction in fluid flow backpressure through selector valve 10 of the present invention. By maintaining backpressure below a target threshold, such as below 5 bar (72.5 psi), users may operate the system at higher flow rates without concern for damage to the components in the analysis system.

The invention has been described herein in considerable detail in order to comply with the patent statutes, and to provide those skilled in the art with the information needed to apply the novel principles and to construct and use embodiments of the invention as required. However, it is to be understood that various modifications can be accomplished without departing from the scope of the invention itself.

The invention claimed is:

1. A multiple channel selector valve, comprising:
a stator having a front face, a dynamic face, and a plurality of passages extending through the stator to fluidically connect the front face and the dynamic face, the plurality of passages including first passages extending between respective first openings in the dynamic face and first ports in the front face, second passages extending between respective second openings in the dynamic face and second ports in the front face, an intake passage extending between an intake opening in the dynamic face and an intake port in the front face, and an outlet passage extending between an outlet opening in the dynamic face and an outlet port in the front face; and
a rotor rotatable with respect to the stator about a rotational axis and having a rotor face configured to sealingly engage with the dynamic face of the stator, the rotor face including a first fluid flow path for fluidically coupling the intake opening to selected ones of the first openings, and a second fluid flow path for fluidically coupling the outlet opening to selected ones of the second openings, the second fluid flow path having a transfer portion and a relief portion, the transfer portion having a proximal end that transitions to the relief portion and a distal end, with the transfer portion being flared from the distal end to the proximal end by between about 10-75°, and the relief portion being annularly arranged about the rotational axis by at least 30°.

2. The multiple channel selector valve as in claim 1 wherein the first and second fluid flow paths include grooves in the rotor face.

3. The multiple channel selector valve as in claim 1 wherein the first openings are circumaxially arranged along an inner opening, and the second openings are circumaxially arranged about an outer ring.

4. The multiple channel sector valve as in claim 1, including an annular collection groove in the dynamic face of the stator, wherein the annular collection groove intersects with the outlet opening.

5. The multiple channel selector valve as in claim 4 wherein the annular collection groove is radially between an inner ring and an outer ring.

6. The multiple channel selector valve as in claim 5 wherein the relief portion of the second fluid flow path is in operable alignment with the annular collection groove.

7. The multiple channel selector valve as in claim 4 wherein the second fluid flow path fluidically connects the annular collection groove to selected ones of the second openings.

8. The multiple channel selector valve as in claim 1 wherein the intake opening is along the rotational axis.

9. A multiple channel selector valve, comprising:
a stator having a front face, a central axis, and a generally opposed dynamic face including a plurality of first openings arranged in a first circumaxial pattern about the central axis, and a plurality of second openings arranged in a second circumaxial pattern about the central axis; and
a rotor rotatable with respect to the stator about a rotational axis coincident with the central axis and having a rotor face configured to sealingly engage with the dynamic face of the stator, the rotor face including a first fluid flow path and a second fluid flow path, the first fluid flow path extending from the rotational center of the rotor face to a first end to selectively fluidically connect to any one the first openings, and the second fluid flow path having a transfer portion and a relief portion, the transfer porting being flared from a distal end in fluid communication with any one of the second openings to a proximal end to by between about 10-75°, and the relief portion being annularly arranged about the rotational axis by at least 30°.

10. The multiple channel selector valve as in claim 9 wherein the relief portion is annularly arranged about the rotational axis by at least about 270°.

11. The multiple channel selector valve as in claim 9 wherein the second fluid flow path fluidically couples any one of the second openings to an outlet opening in the dynamic face of the stator.

12. The multiple channel selector valve as in claim 9, including an annular collection groove in the dynamic face of the stator radially between the first circumaxial pattern and the second circumaxial pattern.

13. The multiple channel selector valve as in claim 12 wherein the annular collection groove intersects with an outlet opening of the dynamic face of the stator.

14. The multiple channel selector valve as in claim 13 wherein the second fluid flow path fluidically couples any one of the second openings to the annular collection groove.

15. The multiple channel selector valve as in claim 14 wherein the relief portion of the second fluid flow path is in operable alignment with the annular collection groove.

16. The multiple channel selector valve as in claim 9, including an inlet opening in the dynamic face of the stator in operable alignment with the rotational center of the rotor face.

* * * * *